United States Patent
Okazaki et al.

(10) Patent No.: US 6,606,288 B1
(45) Date of Patent: Aug. 12, 2003

(54) OPTICAL DISK REPRODUCTION APPARATUS AND METHOD FOR CONTROLLING OPTICAL DISK REPRODUCTION APPARATUS

(75) Inventors: Makoto Okazaki, Niihama (JP); Yasushi Ueda, Saijyo (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/554,408

(22) PCT Filed: Sep. 29, 1999

(86) PCT No.: PCT/JP99/05313

§ 371 (c)(1),
(2), (4) Date: Jul. 11, 2000

(87) PCT Pub. No.: WO00/19426

PCT Pub. Date: Apr. 6, 2000

(30) Foreign Application Priority Data

Sep. 29, 1998 (JP) .......................... 10/275433

(51) Int. Cl.[7] .................................. G11B 5/09
(52) U.S. Cl. .................. 369/47.33; 369/53.31
(58) Field of Search ................ 369/47.29, 47.33, 369/47.39, 47.42, 47.43, 47.44, 53.31, 53.36, 53.35

(56) References Cited

U.S. PATENT DOCUMENTS

| | | | |
|---|---|---|---|
| 5,381,424 A | | 1/1995 | Tsang |
| 5,471,442 A | | 11/1995 | Shimizume .................. 369/32 |
| 5,491,677 A | * | 2/1996 | Sasaki ..................... 369/44.36 |
| 5,621,743 A | | 4/1997 | Tomisawa |
| 5,790,484 A | * | 8/1998 | Maeda et al. .................. 711/4 |
| 5,848,031 A | * | 12/1998 | Kondo et al. ............ 369/30.09 |
| 5,894,459 A | * | 4/1999 | Kurita et al. ............ 369/13.02 |
| 5,910,935 A | | 6/1999 | Takagi et al. .................. 369/54 |
| 5,970,031 A | * | 10/1999 | Huang et al. ............ 369/44.28 |
| 5,995,462 A | * | 11/1999 | Harold-Barry ........... 369/53.18 |
| 5,995,470 A | * | 11/1999 | Tsubaki et al. .......... 369/47.13 |
| 6,018,506 A | * | 1/2000 | Okabe et al. ............ 369/30.23 |
| 6,400,667 B1 | * | 6/2002 | Utsumi et al. ............ 369/53.34 |

FOREIGN PATENT DOCUMENTS

| | | |
|---|---|---|
| CN | 1132909 A | 10/1996 |
| JP | 9-17124 | 1/1997 |

* cited by examiner

Primary Examiner—Thang V. Tran
Assistant Examiner—Bach Vuong
(74) Attorney, Agent, or Firm—Parkhurst & Wendel, L.L.P.

(57) ABSTRACT

An optical disk reproduction apparatus comprising a microcomputer (7) for resuming reading data from an optical disk (1) when buffering to a memory (6) is interrupted, a continuous data detector (55) for dividing first data buffered in the memory (6) before the buffering interruption and second data read out in accordance with an instruction from the microcomputer (7) into "n" groups, respectively, and detecting whether the first data and the second data are in coincidence for each group, and a buffering resumption request generating circuit (56) for instructing a timing of buffering resumption on the basis of a result of the continuous data detector (55).

8 Claims, 5 Drawing Sheets

OPTICAL DISK REPRODUCTION APPARATUS AND METHOD FOR CONTROLLING OPTICAL DISK REPRODUCTION APPARATUS

TECHNICAL FIELD

The present invention relates to an optical disk reproduction apparatus and a method for controlling an optical disk reproduction apparatus and, more particularly, to an optical disk reproduction apparatus which can successively reproduce data recorded on an optical disk and a method for controlling the optical disk reproduction apparatus.

BACKGROUND ART

An optical disk reproduction apparatus has a servo for controlling rotation of an optical disk and a position of an optical pickup so as to correctly read out data recorded on the disk at a constant rate. The servo is easily affected by vibrations, or flaws or dusts on the disk and thus, reading of data is sometimes interrupted. Therefore, a shockproof function is required to resume reading of data from an appropriate position so as to prevent data from being output discontinuously, even when the reading of data is interrupted. At this time, since a position where the reading of data is to be resumed cannot be decided only by the control of a position of the optical pickup, the above-described position for resumption is Usually decided after the data is confirmed by using the shockproof function.

FIG. 5 is a block diagram illustrating a structure of a prior art musical CD reproduction apparatus. A disk 21 is a CD having musical data recorded thereon. An optical pickup 22 irradiates a laser light to the disk 21 to read the musical data recorded on the disk 21. An analog signal processing unit 23 obtains conditions of tracking and focusing from the data read by the optical pickup 22 as well as binarizes the data read by the optical pickup 22. A servo 24 controls the tracking and the focusing of the optical pickup 22. A digital signal processing unit 25 comprises a CIRC (Cross-Interleave-Reed-Solomon Code) processing unit 251, a formatting circuit 252, a memory arbitration circuit 253, an output data FIFO memory 254, a comparator 255, and a buffering resumption request generating circuit 256, and processes data binarized by the analog signal processing unit 23 to output processed data as reproduced data. A memory 26 temporarily stores the data processed by the digital signal processing unit 25. A microcomputer 27 obtains information from the respective elements and controls operations of the respective elements.

An operation of the prior art musical CD reproduction apparatus will be described. The optical pickup 22 irradiates a laser light to the disk 21 and converts a light reflected from the disk 21 into a signal to output the signal to the analog signal processing unit 23. The analog signal processing unit 23 outputs conditions of tracking and focusing to the servo 24 on the basis of the signal from the optical pickup 22 as well as binarizes the signal from the optical pickup 22 to output a binarized signal to the digital signal processing unit 25. The servo 24 outputs a control signal to the optical pickup 22 on the basis of the information from the analog signal processing unit 23 to control the tracking and the focusing. The CIRC processing unit 251 performs, for the binarized data, EFM (Eight to Fourteen Modulation) demodulation, separation of CD (Compact Disk)-DA (Digital Audio) data from subcode data, and error correction processing for the CD-DA data, and outputs processed data to the formatting circuit 252. The formatting circuit 252 converts the CD-DA data output from the CIRC processing unit 251 into a prescribed format and then outputs converted data to the memory 26 via the memory arbitration circuit 253. Data buffered in the memory 26 is read out at a prescribed rate to be sent to the output data FIFO memory 254 via the memory arbitration circuit 253, and output the same as reproduced data. An amount of the data stored in the memory 26, being controlled by the. microcomputer 27, does not exceed a capacity of the memory 26.

During reproduction from the disk 21, when the microcomputer 27 detects, on the basis of the information from the servo 24, that an error occurs in the reading of data, the microcomputer 7 instructs the digital signal processing unit 25 to interrupt the buffering as well as instructs the servo 24 to move the optical pickup 22 to a position before the position of data where the reading error occurs on the disk 21. In addition, the latest block of data buffered in the memory 26 is kept in the comparator 255 as expectation data.

The comparator 255 captures the CD-DA data read out from the disk 21 after the optical pickup 22 moves, and compares the CD-DA data with the expectation data. The comparator 255 outputs "H" when all the data are in coincidence, and outputs "L" when at least one of the data is in uncoincidence, to the buffering resumption request generating circuit 256.

When the buffering resumption request generating circuit 256 receives "H" from the comparator 255, the buffering resumption request generating circuit 256 requests the formatting circuit 252 to resume the buffering, and then the formatting circuit 252 resumes the buffering from data following to the CD-DA data which is judged in coincidence by the comparator 255. On the other hand, when the buffering resumption request generating circuit 256 receives "L" from the comparator 255, the microcomputer 27 instructs the servo 24 to move the optical pickup 22 to a further forward position, and continues to compare the CD-DA data with the expectation data until the comparator 255 outputs "H".

Usually, when the CD-DA data is reproduced by an optical disk reproduction apparatus having the above-described structure, the data read out from the disk 21 is controlled to be read out at a higher rate than that of data output as reproduced data from the output data FIFO memory 254. That is, a rate of buffering data in the memory 26 is higher than a rate of reading out data from the memory 26. Therefore, even when the buffering to the memory 26 is interrupted, the output data FIFO memory 254 reads out the data stored in the memory 26 at a prescribed rate and outputs reproduced data. That is, while data is stored in the memory 26, the optical disk reproduction apparatus can output reproduced data continuously.

In addition, Japanese Published Patent Application No.Hei.9-17124 discloses another shockproof function utilizing subcode data. When the buffering is interrupted, the shockproof function disclosed herein reads out and holds time information contained in subcode data which is written last, returns a CD pickup unit to an interruption point, then compares time information of subcode data included in data read out thereat with the time information held at the interruption, and instructs a timing of the buffering resumption.

On the other hand, when data is read out by the optical disk reproduction apparatus, errors may creep in the data. Further, there is a possibility that errors still remain in data after error correction is performed and that the data containing the errors are output as reproduced data. Here, in many cases, the errors contained in the reproduced data are of a negligible level. Particularly, in case of a musical CD where adjacent data have high correlations, even if a few errors are contained in the reproduced data, the errors cannot be recognized by the human ear in many cases.

In the prior art optical disk reproduction apparatus as described above, errors occurring also during a usual reproduction, independent of the buffering interruption, may be contained in the expectation data held in the comparator 255 and the CD-DA data. Therefore, in some cases, the comparator 255 cannot confirm coincidence of all data sequences and thus, the buffering cannot be resumed.

The present invention is made to solve the above problems, and it is an object of the present invention to provide an optical disk reproduction apparatus which can appropriately instruct buffering resumption, even when errors occurring in data independent of the buffering interruption are contained.

In addition, in the method disclosed in Japanese Published Patent Application No.Hei.9-17124, since the CD-DA data is not buffered by directly utilizing the time information of subcode data, a timing of the buffering and a timing of reading subcode data do not always completely coincide. Therefore, when the buffering is resumed on the basis of the confirmation of only the subcode data, it may occur that discontinuous data are buffered.

The present invention is made to solve the above problems, and it is an object of the present invention to provide an optical disk reproduction apparatus and a controlling method therefor, which apparatus can appropriately instructs the buffering resumption without utilizing the subcode data.

DISCLOSURE OF THE INVENTION

The present invention provides an optical disk reproduction apparatus which receives a reflected light obtained by irradiating a laser light to an optical disk thereby reading data recorded on the optical disk, temporarily buffers the data in a successively rewritable memory having a prescribed capacity, and then outputs the data as reproduced data, and comprises control means for resuming reading the data from the optical disk when buffering to the memory is interrupted, data coincidence detecting means for dividing first data buffered in the memory before the buffering interruption and second data read out by the control means into "n" groups, respectively, and detecting whether the first data and the second data are in coincidence for each group, and a buffering resumption request generating circuit for instructing a timing of buffering resumption on the basis of a result of the data coincidence detecting means.

Further, in the present invention, the data coincidence detecting means further comprises plural comparators each of which holds the first data and the second data, which are divided into the plural groups, one group by one, and compares the both data to decide whether each group of the divided data are in coincidence, an adder for obtaining a total number of the groups, for which groups it is decided that the first data and the second data are in coincidence, and a subtracter for obtaining a value of (a prescribed decision threshold)−(the total number)/(the value of "n"), and the buffering resumption request generating circuit instructs the timing of buffering resumption when the value obtained by the subtracter is 0 or less.

Further, in the present invention, the decision threshold can be set manually.

Further, in the present invention, the decision threshold is a ratio of an amount of data which is correctly reproduced to an amount of data which is reproduced by the optical disk reproduction apparatus.

Further, the present invention provides a control method for controlling an optical disk reproduction apparatus which receives a reflected light obtained by irradiating a laser light to an optical disk thereby reading data recorded on the optical disk, temporarily buffers the data in a successively rewritable memory having a prescribed capacity, and then outputs the data as reproduced data, and comprises a control step for resuming reading the data from the optical disk when buffering to the memory is interrupted, a data coincidence detecting step for dividing first data buffered in the memory before the buffering interruption and second data read out in the control step into "n" groups, respectively, and detecting whether the first data and the second data are in coincidence for each group, and a buffering resumption request step for instructing a timing of buffering resumption, on the basis of a result of the data coincidence detecting step.

Further, the present invention provides a storage medium storing a program code for executing the optical disk reproduction apparatus control method.

Further, in the present invention, the data coincidence detecting step further comprises a comparison step for holding the first data and the second data, which are divided into the plural groups, one group by one, and comparing the both data thereby deciding whether the data are in coincidence, an addition step for obtaining a total number of the groups, for which groups it is decided that the first data and the second data are in coincidence, and a subtraction step for obtaining a value of (a prescribed decision threshold)−(the total number)/(the value of "n"), and the buffering resumption request step instructs the timing of buffering resumption when the value obtained in the subtraction step is 0 or less.

Further, the present invention provides a storage medium storing a program code for executing the optical disk reproduction apparatus control method.

According to the present invention, when the buffering to a memory is interrupted for some reason, the optical disk reproduction apparatus can resume the reading of data from the optical disk, divide each of the first data buffered in the memory before the buffering interruption and the second data read out after the buffering interruption into plural groups, and detect whether the first data and the second data are in coincidence for each group, and instruct the timing of buffering resumption on the basis of that result. Therefore, even if an error occurring also at normal reproduction, independent of the buffering interruption, is contained in data to be compared, the buffering resumption can be instructed appropriately.

In addition, according to the present invention, the optical disk reproduction apparatus instructs the timing of buffering resumption by utilizing the CD-DA data. Therefore, the timing of buffering can be instructed more correctly, with relative to an optical disk reproduction apparatus and a control method therefor, in which the timing of the buffering resumption is instructed by utilizing only the subcode data.

BEST EMBODIMENTS FOR EXECUTING THE INVENTION

Hereinafter, the present invention will be described in more detail, with reference to the accompanying drawings.

Figure 1:
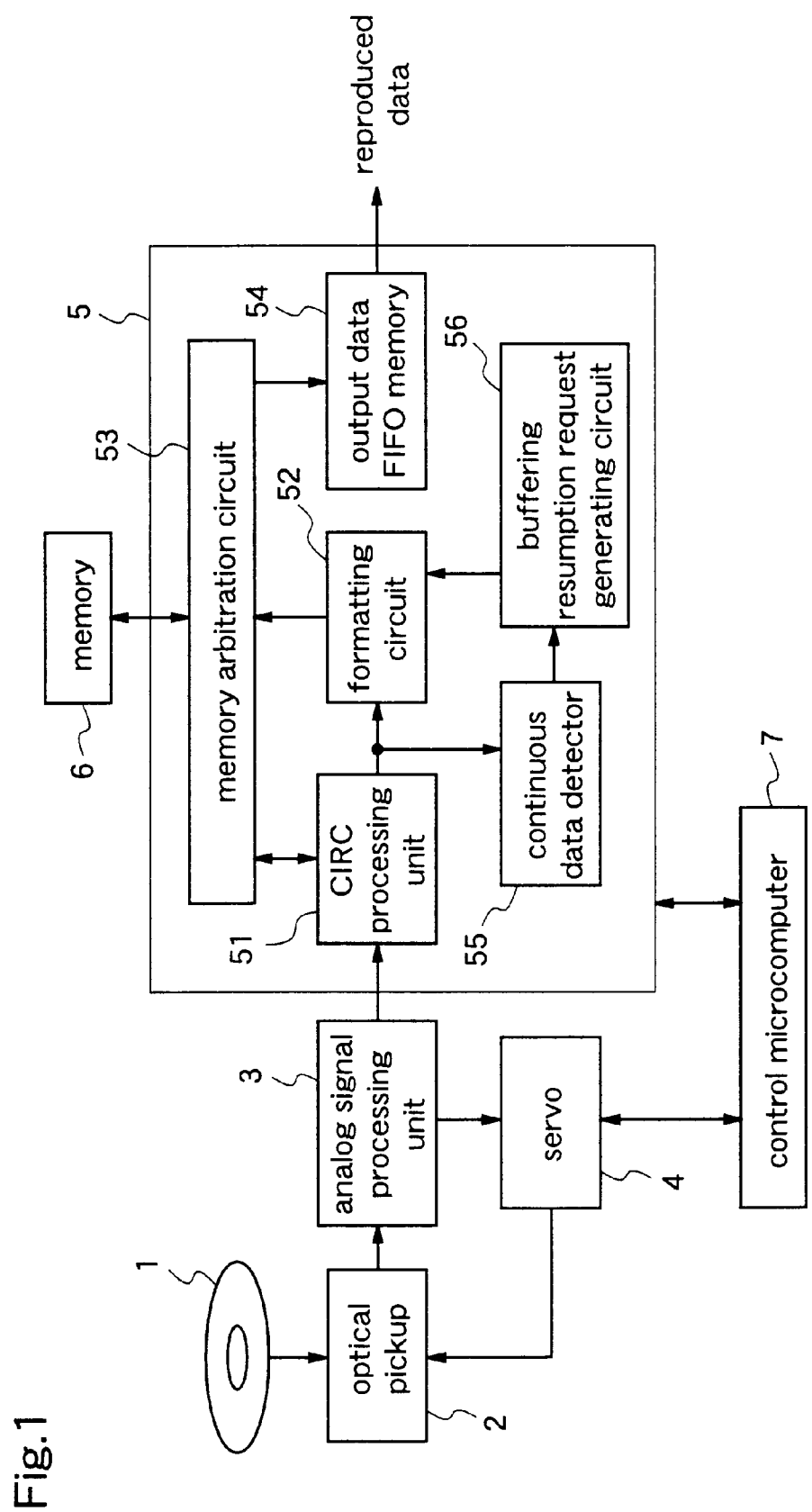
FIG. 1 is a block diagram illustrating a structure of an optical disk reproduction apparatus according to a preferred embodiment of the present invention.

FIG. 1 is a block diagram illustrating a structure of an optical disk reproduction apparatus according to a preferred embodiment of the present invention. An optical disk 1 is a CD having musical data recorded thereon. An optical pickup 2 irradiates a laser light to the optical disk 1 to read the musical data recorded on the optical disk 1. An analog signal processing unit 3 obtains conditions of tracking and focusing from the data read by the optical pickup 2 as well as binarizes the data read by the optical pickup 2. A servo 4 controls the tracking and the focusing of the optical pickup 2. A digital signal processing unit 5 comprises a CIRC processing unit 51, a formatting circuit 52, a memory arbitration circuit 53, an output data FIFO memory 54, a continuous data detector 55, and a buffering resumption request generating circuit 56, and processes data binarized by the analog signal processing unit 3 to output processed data as reproduced data. A memory 6 temporarily stores the data processed by the digital signal processing unit 5. A microcomputer 7 obtains information from the respective elements and controls operations of the respective elements.

An operation of the optical disk reproduction apparatus according to the preferred embodiment will be described. The optical pickup 2, being controlled by the servo 4, irradiates a laser light to the optical disk 1 and converts a light reflected from the optical disk 1 into a signal, and outputs the signal to the analog signal processing unit 3. The analog signal processing unit 3 outputs conditions of tracking and focusing to the servo 4 on the basis of the signal from the optical pickup 2 as well as binarizes the signal from the optical pickup 2 to output a binarized signal to the digital signal processing unit 5. The servo 4 outputs a control signal to the optical pickup 2 on the basis of the information from the analog signal processing unit 3, thereby controlling the tracking and the focusing.

The digital signal processing unit 5 receives the data binarized by the analog signal processing unit 3 in the CIRC processing unit 51, and the CIRC processing unit 51 performs the EFM demodulation, the separation of CD-DA data from subcode data, and the error correction processing of the CD-DA data, and outputs processed data to the formatting circuit 52. The formatting circuit 52 converts the CD-DA data output from the CIRC processing unit 51 into a prescribed format, and buffers converted data in the memory 6 via the memory arbitration circuit 53. The data buffered in the memory 6 is read out to be sent to the output data FIFO memory 54 via the memory arbitration circuit 53 at a prescribed rate, and output the same as reproduced data. The data output from the output data FIFO memory 54 is controlled to be read out at a lower rate than that of the data read out from the optical disk 1. That is, a rate of buffering data in the memory 6 is higher than a rate of reading out data from the memory 6. The buffering into the memory 6 is controlled by the microcomputer 7, according to a capacity of the memory 6.

When the buffering of the CD-DA data into the memory 6 is interrupted for some reason and thereafter the reading from the disk 1 is resumed, the continuous data detector 55 detects whether data before the buffering interruption and data after the reading resumption coincide. According to the result of the continuous data detector 55, the buffering resumption request generating circuit 56 instructs a timing of buffering resumption to the formatting circuit 52.

Figure 2:
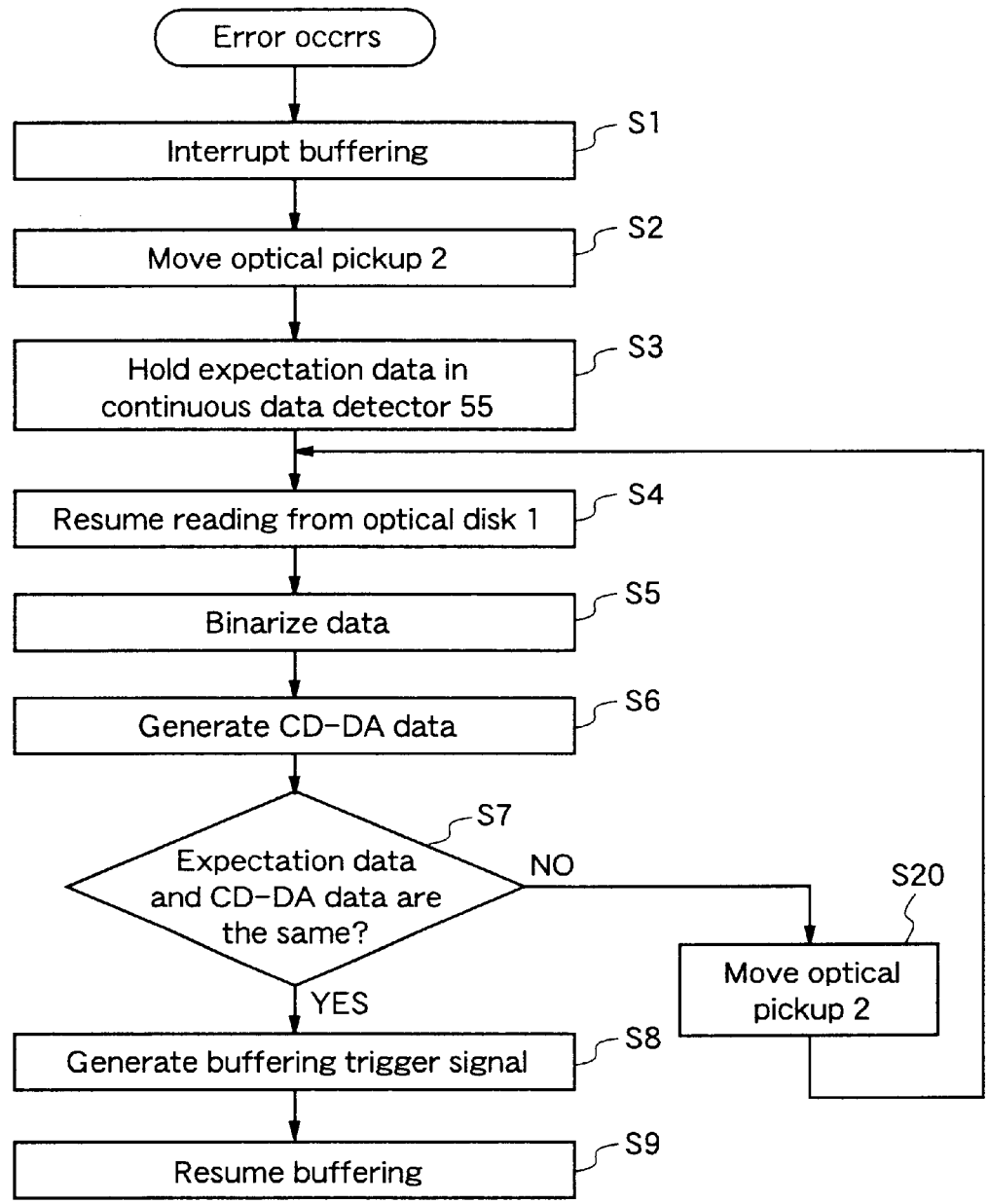
FIG. 2 is a flowchart for explaining an operation of the optical disk reproduction apparatus when a reading error occurs during the reproduction from an optical disk.

FIG. 2 is a flowchart for explaining an operation of the optical disk reproduction apparatus, when the microcomputer 7 detects that an error occurs in the reading of data during the reproduction from the optical disk 1, on the basis of the information from the servo 4 and the digital signal processing unit 5. The operation of the optical disk reproduction apparatus in case a reading error occurs will be described with reference to FIGS. 1 and 2.

When an error occurs in the data reading, the digital signal processing unit 5 interrupts the buffering in accordance with an instruction from the microcomputer 7 in step S1. Next, in step S2, the servo 4 moves the optical pickup 2 to a position before a position of data where a reading error occurs on the optical disk 1, in accordance with an instruction from the microcomputer 7. The position to which the optical pickup 2 is to be moved is decided on the basis of an address of the data which has already been read out.

Then, in step S3, the continuous data detector 55 divides a data sequence of a block, which is one block before the block for which the buffering is interrupted among the data stored in the memory 6, into n pieces (n is an integer which is 2 or more) of data, and holds divided data sequences as expectation data sequences, in accordance with an instruction from the microcomputer 7.

In step S4, after moving its position in accordance with an instruction from the servo 4, the optical pickup 2 reads out a data sequence of one block from the optical disk 1. Instep S5, the analog signal processing unit 3 binarizes the read out data sequence. In step S6, the CIRC processing unit 51 performs the above-described processings to a binarized data sequence to generate a CD-DA data sequence, and output the CD-DA data sequence to the continuous data detector 55.

In step S7, the continuous data detector 55 divides the CD-DA data sequence into n pieces as in step S3 to capture the divided data sequences, and decides whether the expectation data sequence and the CD-DA data sequence are the same for each divided data sequence. When it is decided that the both data are the same (YES) in step S7, the processing goes to step S8 and the buffering resumption request generating circuit 56 outputs a buffering resumption trigger signal to the formatting circuit 52. The trigger signal is output in such a timing that the CD-DA data which is output from the CIRC processing unit 51 can be buffered immediately after it is decided YES in step S7. When detecting the buffering resumption trigger signal, the formatting circuit 52 converts the CD-DA data into a prescribed format and resumes the buffering to the memory 6 (step S9).

On the other hand, when it is decided that the both data are not the same (NO) in step S7, the processing goes to step S20 and the microcomputer 7 instructs the servo 4 to move the optical pickup 2 to a further forward position. Thereafter, the processing goes back to step S4 and the above operations are repeated. Here, the operations from steps S1 to S3 can be performed in random order.

Figure 3:
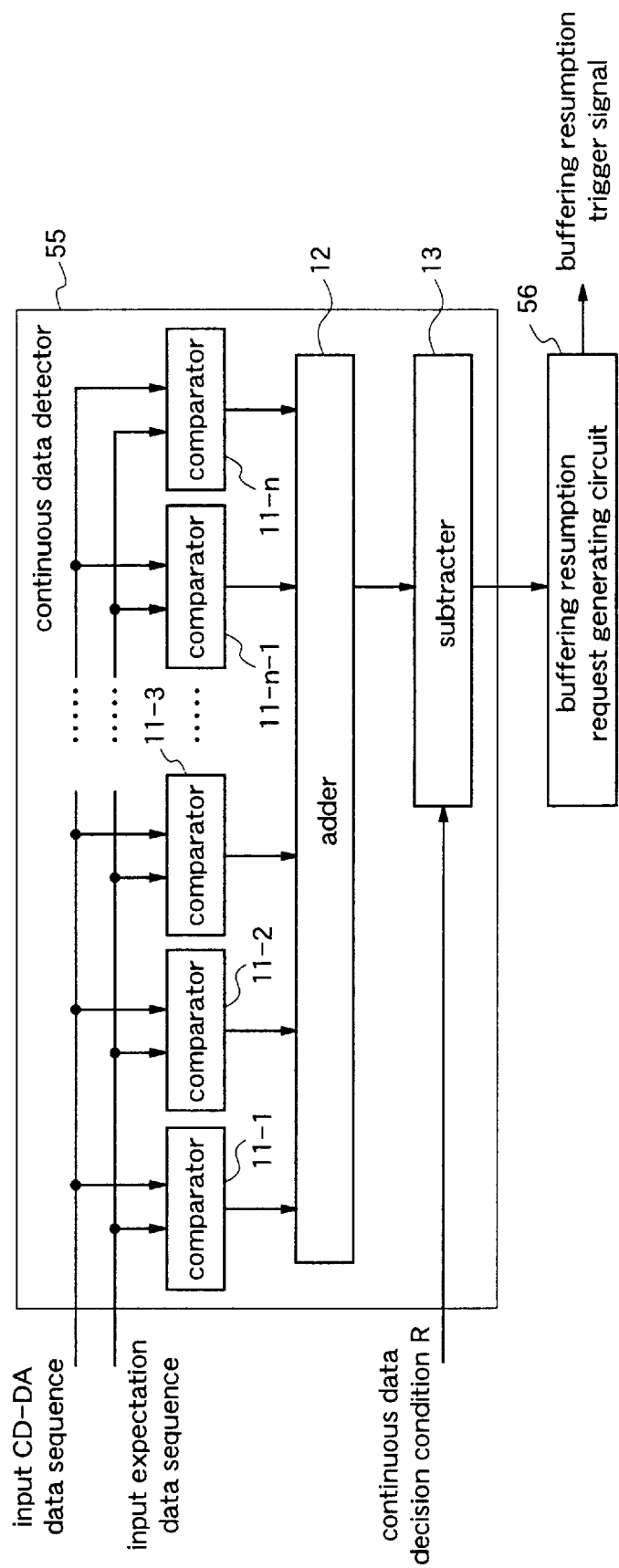
FIG. 3 is a block diagram illustrating structures of a continuous data detector and a buffering resumption request generating circuit.

Structures and operations of the continuous data detector 55 and the buffering resumption request generating circuit 56 will be described in more detail. FIG. 3 is a block diagram illustrating the structures of the continuous data detector 55 and the buffering resumption request generating circuit 56. The continuous data detector 55 comprises comparators 11-1 to 11-n for dividing each of the expectation data sequence and the CD-DA data sequence into "n" groups, respectively, and comparing data sequences for each group, an adder 12 for obtaining a total number of groups, for which groups it is decided that the expectation data sequence and the CD-DA data sequence are the same, and a subtracter 13 for comparing a calculation result of the adder 12 with a continuous data decision threshold R.

Figure 4:
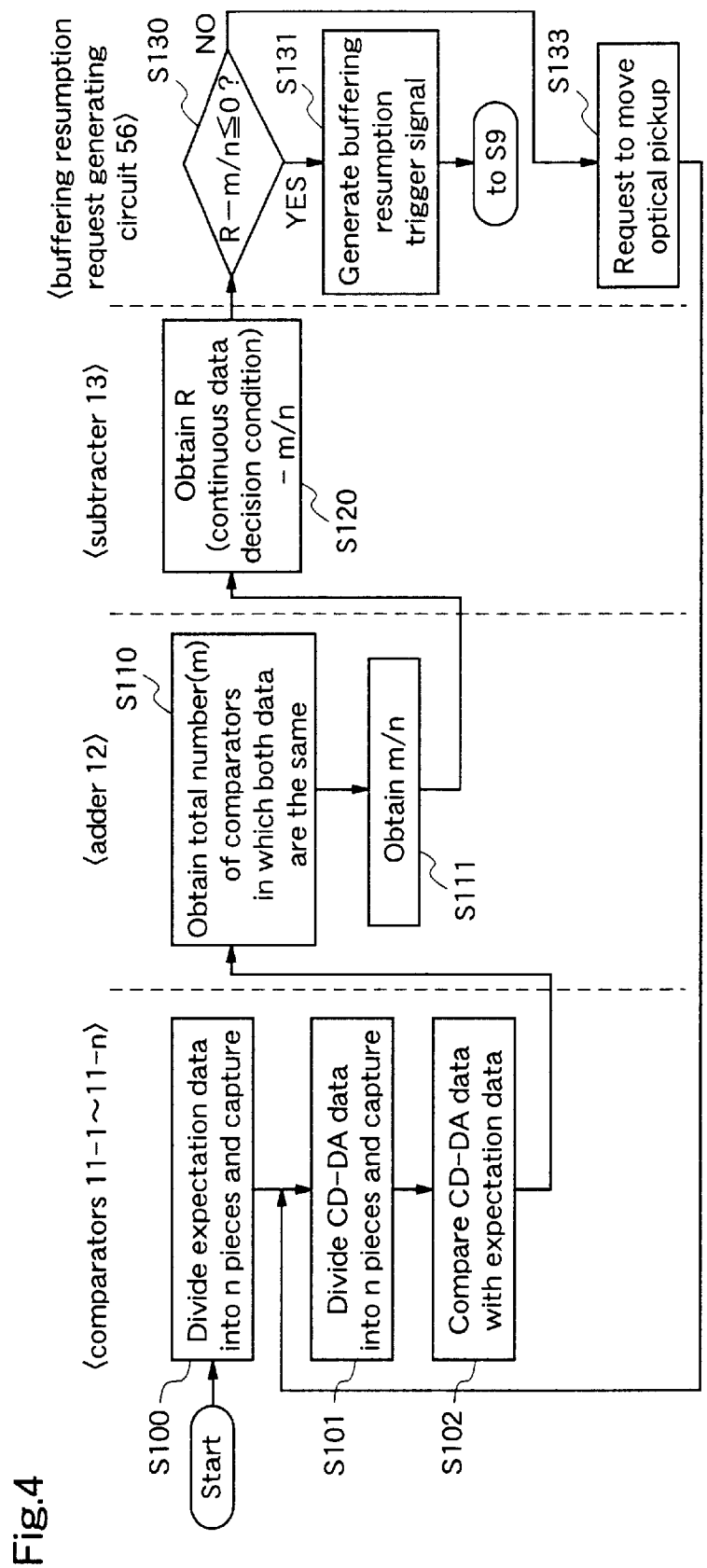
FIG. 4 is a flowchart for explaining operations of the continuous data detector and the buffering resumption request generating circuit.
Figure 5:
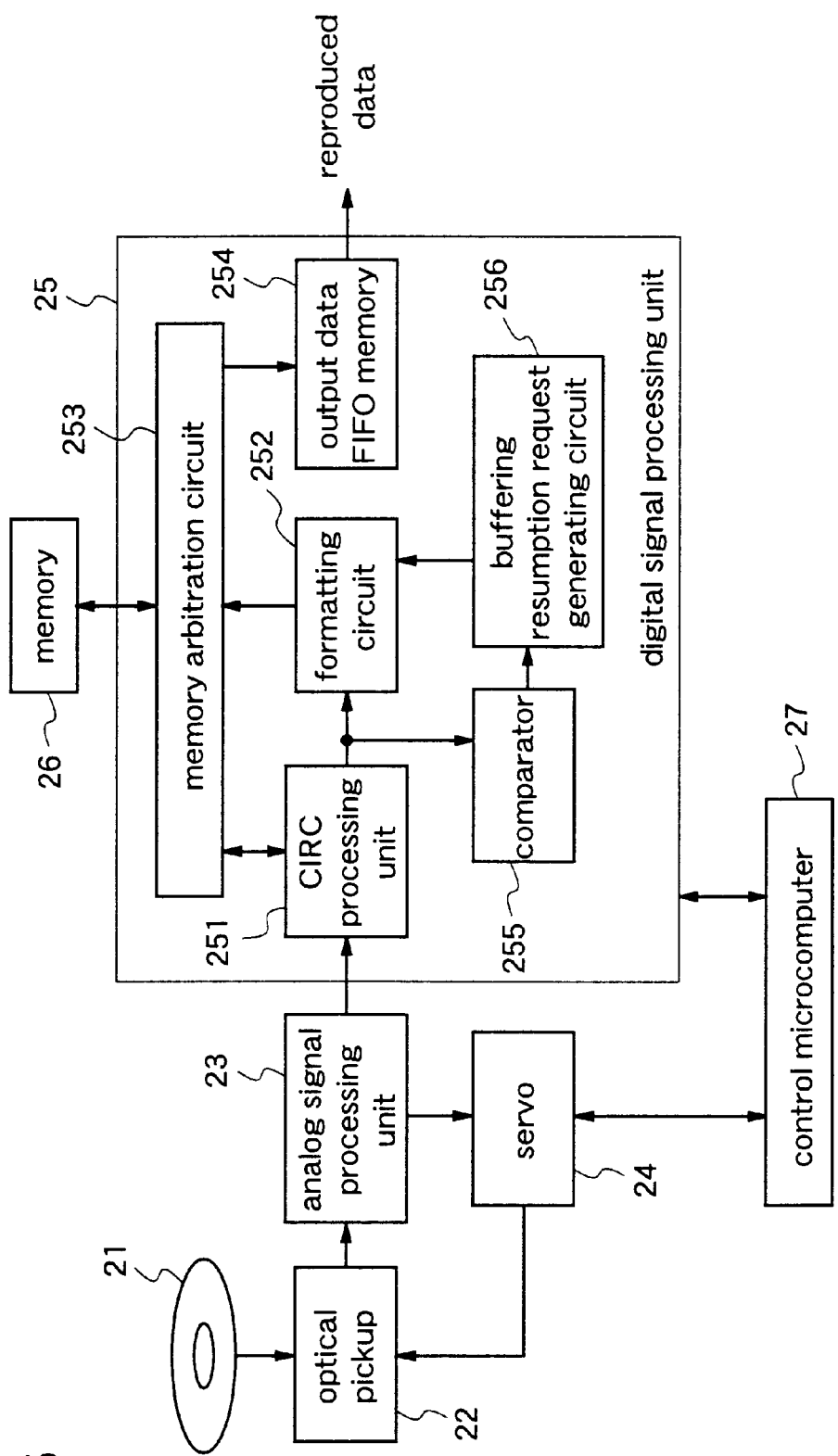
FIG. 5 is a block diagram illustrating a structure of a prior art musical CD reproduction apparatus.

FIG. 4 is a flowchart for explaining operations of the continuous data detector 55 and the buffering resumption request generating circuit 56, and shows steps S3, S7, and S8 in the flowchart of FIG. 2 in more detail. The operations of the continuous data detector 55 and the buffering resumption request generating circuit 56 will be described with reference to FIGS. 1 to 4.

In step S100 (corresponding to step S3 in FIG. 2), the comparators 11-1 to 11-n divide a data sequence of a block just before the block, for which block the buffering is interrupted among blocks of the data stored in the memory 6, into "n" groups, and captures the divided data sequence, one group by one, as an expectation data sequence. For example, when a data sequence comprises 200 pieces of data, the data sequence is divided into 10 (=n) groups successively from the head, each group comprising 20 pieces of data. Then, the data sequences divided into 10 groups are input to the 10 comparators, one group by one.

When the CD-DA data is generated in step S6 of FIG.2, the comparators 11-1 to 11-n divide a CD-DA data sequence into n pieces and capture the divided CD-DA data sequences, respectively, in step S101, as in step S100.

In step S102, each of the comparators 11-1 to 11-n compares the CD-DA data sequence with the expectation data sequence, and decides whether each pair of the expectation data sequences and the CD-DA data sequences, which are divided into n pieces, respectively, are in coincidence. To the adder 12, "H" is output when the both data sequences are in coincidence, and "L" is output when the both data sequences are in uncoincidence.

In step S110, the adder 12 additionally counts the number of "H", which are output from the comparators 11-1 to 11-n to obtain the total number m. In step S111, the adder 12 obtains a value m/n and output the value m/n to the subtracter 13.

In step S120, the subtracter 13 subtracts the value m/n from the continuous data decision threshold R set by the microcomputer 7, and outputs a value R−m/n to the buffering resumption request generating circuit 56. Here, the continuous data decision threshold R can be freely set by the microcomputer 7. For example, a normal data reproduction ratio which means a ratio of correct reproduction by the optical disk reproduction apparatus can be set as R (for example, when 90% of data is correctly reproduced, R=9/10). Or, an arbitrary value can be input by a user. When R=1, it means that the data recorded on an optical disk and the reproduced data are completely the same. When R is set in consideration of the rate of data reproduction at normal states, it can be judged whether an error included in data to be compared comes from the buffering interruption or comes from the errors generated by the normal reproduction.

In step S130, the buffering resumption request generating circuit 56 decides whether the value of R−m/n is 0 or less, i.e., whether the compared CD-DA data is in coincidence with the expectation data. When it is decided in step S130 that the value of R−m/n is 0 or less (YES), i.e., the compared CD-DA data is in coincidence with the expectation data, the processing goes to step S131 (corresponding to step S8 in FIG. 2) and the buffering resumption request generating circuit 56 generates a buffering resumption trigger signal and outputs the trigger signal to the formatting circuit 52. The formatting circuit 52 which has received the trigger signal resumes the buffering (step S9).

When it is decided in step S130 that R−m/n is not 0 or less (NO), i.e., the compared CD-DA data is in uncoincidence with the expectation data, the processing goes to step S133 and the buffering resumption request generating circuit 56 requests the microcomputer 7 to move the optical pickup 2, and then the processing goes back to step S101.

In the optical disk reproduction apparatus according to the preferred embodiment of the present invention, the rate of buffering data into the memory 6 is controlled to be higher than the rate of reading out data from the memory 6. Therefore, even if the buffering into the memory 6 is interrupted, the output data FIFO memory 54 reads out data stored in the memory 6 at a prescribed rate and continues to output reproduced data, while the data are being stored in the memory 6. The above-described steps S2 to S9 are carried out while the output data FIFO memory 54 are outputting the reproduced data.

As described above, the optical disk reproduction apparatus of the preferred embodiment divides the expectation data and the CD-DA data into plural groups to perform comparison, and decides the timing for buffering resumption on the basis of the number of groups which are in coincidence and the continuous data decision threshold R. Therefore, when R is decided in consideration of the data reproduction ratio at normal states, it can be judged whether an error included in data to be compared comes from the buffering interruption or comes from the error generated by normal reproduction, which enables instructing the buffering resumption appropriately.

In addition, the optical disk reproduction apparatus according to the preferred embodiment can instruct the timing of buffering resumption more correctly, because it utilizes not the subcode data but the CD-DA data.

In the foregoing, the optical disk reproduction apparatus which can appropriately instruct the buffering resumption when errors occur in reading from the optical disk for some reason, is described. However, the above-described embodiment can also be applied to the control of data which is to be buffered into the memory 6. That is, since the rate of outputting the reproduced data is smaller than the rate of buffering data into the memory 6, when it comes to a state where data are stored in the memory 6 to its uppermost capacity, the buffering to the memory 6 is interrupted. Even in case where such buffering interruption occurs, if the microcomputer 7 is set such that the operation described in the flowchart of FIG. 2 is carried out, the buffering resumption can be instructed correctly without deteriorating the continuity in the reproduced data.

In addition, the present invention can be applied not only to an apparatus for reproducing an optical disk having CD-DA data recorded thereon but also to an apparatus for reproducing an optical disk which is used as a Read Only Memory (ROM) for a computer. In the latter case, it is required to add a function of a CD-ROM decoder to the optical disk reproduction apparatus of the above-described embodiment.

Further, the object of the present invention is achieved by a microcomputer in an optical disk reproduction apparatus performing reading from a storage medium having a program code of a software which realizes the function of the embodiment recorded thereon. Therefore, the storage medium having the program code recorded thereon constitutes the present invention.

APPLICABILITY IN INDUSTRY

As described above, the optical disk reproduction apparatus and the control method therefor according to the present invention are appropriately applied to an apparatus for reproducing an optical disk which has CD-DA data recorded thereon or which is used as a Read Only Memory (ROM) for a computer.

What is claimed is:

1. A reproduction apparatus for receiving a reflected light obtained by irradiating laser light on an optical disk for reading data recorded on such optical disk, temporarily buffering the read data in a successively rewritable memory having a prescribed capacity, and then outputting the read data as reproduced data, comprising:

control means for resuming reading data from an optical disk when buffering read data to the memory is interrupted;

data coincidence detecting means for dividing first data buffered in the memory before the buffering interruption and second data read out by the control means into "n" groups, respectively, and detecting whether the first data and the second data are in coincidence for each group; and a buffering resumption request generating circuit for instructing a timing of buffering resumption on the basis of a result of the data coincidence detecting means.

2. The reproduction apparatus of claim 1, wherein the data coincidence detecting means further comprises:

plural comparators each for holding the first data and the second data, and comparing the held first and second data to decide whether each group of the divided data are in coincidence, and identifying coincident groups of data;

an adder for obtaining a total number of the coincident groups; and a subtracter for obtaining a value of:

(a prescribed decision threshold)−(the total number)/(the value of "n"), and the buffering resumption request generating circuit for instructing a timing of buffering resumption when the value obtained by the subtracter is at most zero.

3. The reproduction apparatus of claim 2, wherein the decision threshold comprises a manually set decision threshold.

4. The reproduction apparatus of claim 2, wherein the decision threshold is defined as a ratio of a first amount of data that is correctly reproduced to a second amount of data that is reproduced by the optical disk reproduction apparatus.

5. A method for controlling a reproduction apparatus for receiving reflected light obtained by irradiating laser light on an optical disk for reading data recorded on such optical disk, temporarily buffering the read data in a successively rewritable memory having a prescribed capacity, and then outputting the read data as reproduced data, the method comprising:

resuming reading data from an optical disk when reading data and buffering the read data to the memory is interrupted;

dividing first data buffered in the memory before the buffering interruption and second data read out in said resuming reading into "n" groups, respectively, and detecting whether the first data and the second data are in coincidence for each group; and resuming buffering on the basis of a result of said dividing first data.

6. The method of claim 5, wherein
said dividing first data further comprises:

holding the first data and the second data, comparing the held first and second data to determine whether the data are in coincidence, and identifying coincident groups;

obtaining a total number of the coincident groups; and obtaining a value of:

(a prescribed decision threshold)−(the total number)/(the value of "n"), and said resuming buffering further comprises timing buffering resumption when said obtained value is at most zero.

7. A computer-readable storage medium storing a program code for executing a method for controlling a reproduction apparatus for receiving reflected light obtained by irradiating laser light on an optical disk for reading data recorded on the optical disk, temporarily buffering the read data in a successively rewritable memory having a prescribed capacity, and then outputting the data as reproduced data, the method comprising:

resuming reading data from an optical disk when reading data and buffering the read data to the memory is interrupted;

dividing first data buffered in the memory before the buffering interruption and second data read out in said reading into "n" groups, respectively, and detecting whether the first data and the second data are in coincidence for each group; and resuming buffering on the basis of a result of said dividing first data.

8. A computer-readable storage medium storing a program code for executing a method for controlling a reproduction apparatus for receiving reflected light obtained by irradiating laser light on an optical disk for reading data recorded on the optical disk, temporarily buffering the read data in a successively rewritable memory having a prescribed capacity, and then outputting the data as reproduced data, the method comprising:

resuming reading data from an optical disk when reading data and buffering the read data to the memory is interrupted;

dividing first data buffered in the memory before the buffering interruption and second data read out in said resuming reading into "n" groups, respectively, and detecting whether the first data and the second data are in coincidence for each group, wherein the dividing first data further comprises:

holding the first data and the second data, comparing the held first and second data to determine whether the data are in coincidence, and identifying coincident groups;

obtaining a total number of the coincident groups; and obtaining a value of:

(a prescribed decision threshold)−(the total number)/(the value of "n"); and resuming buffering when the obtained value is at most zero.

* * * * *